Figure 1:
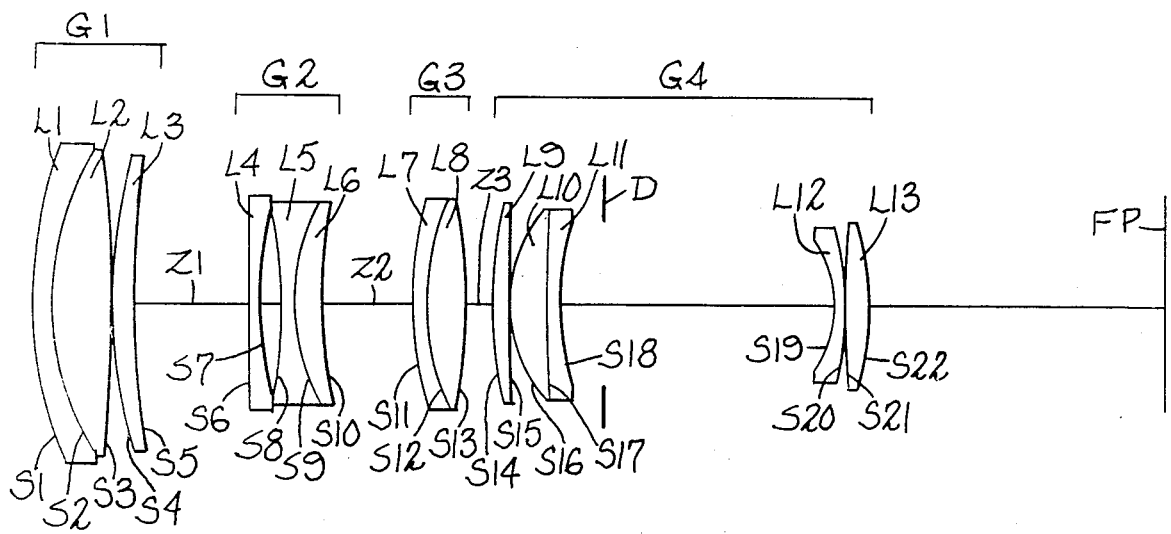

United States Patent [19]
Betensky et al.

[11] 4,307,943
[45] Dec. 29, 1981

[54] CLOSE FOCUSING ZOOM LENS

[75] Inventors: Ellis I. Betensky, New York, N.Y.; Melvyn H. Kreitzer, Cincinnati, Ohio

[73] Assignee: Vivitar Corporation, San Francisco, Calif.

[21] Appl. No.: 178,529

[22] Filed: Aug. 15, 1980

Related U.S. Application Data

[63] Continuation-in-part of Ser. No. 941,530, Sep. 11, 1978, abandoned, which is a continuation-in-part of Ser. No. 71,132, Sep. 6, 1979, abandoned.

[51] Int. Cl.$^3$ ............................................. G02B 15/18
[52] U.S. Cl. ................................................... 350/428
[58] Field of Search ................................ 350/427, 428

[56] References Cited

U.S. PATENT DOCUMENTS

| | | | |
|---|---|---|---|
| 3,524,696 | 8/1970 | Higuchi | 350/427 |
| 3,615,125 | 10/1971 | Guchi et al. | 350/427 |
| 3,784,284 | 1/1974 | Nakamura | 350/428 |
| 3,884,555 | 5/1975 | Suwa et al. | 350/428 |
| 4,094,586 | 6/1978 | Sato et al. | 350/427 |
| 4,240,699 | 12/1980 | Sato et al. | 350/427 |

*Primary Examiner*—John K. Corbin
*Assistant Examiner*—Scott J. Sugarman
*Attorney, Agent, or Firm*—DeLio and Montgomery

[57] ABSTRACT

A zoom lens having capability of focusing to a magnification of 1:2 through movement of only the front focusing group. The power of the focusing group is chosen in relation to the power of the lens at its long focal length to accomplish close focusing with minimal axial travel while providing good aberration correction.

21 Claims, 3 Drawing Figures

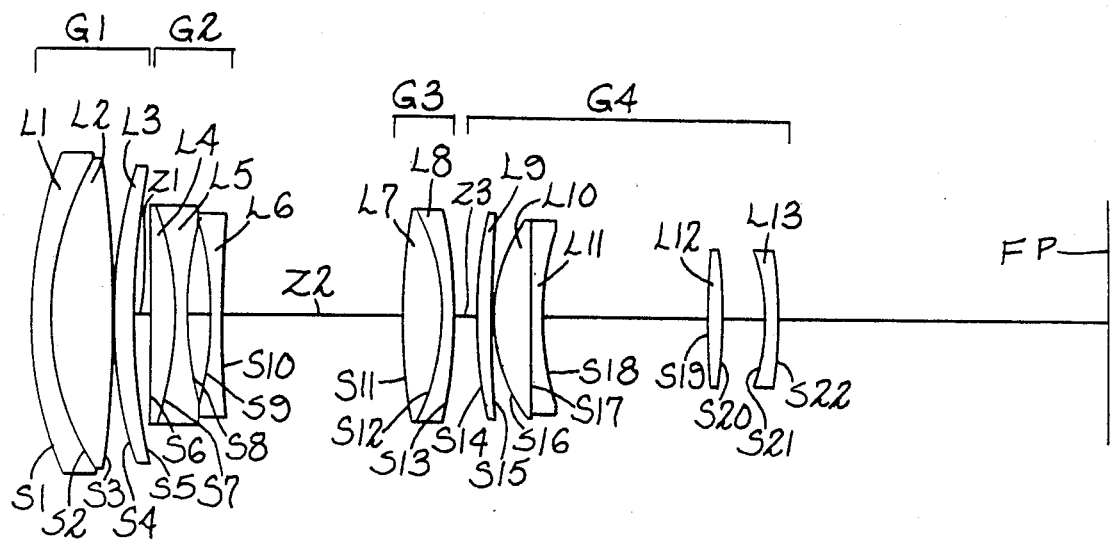

CLOSE FOCUSING ZOOM LENS

This application is a continuation-in-part of application Ser. No. 941,530, filed Sept. 11, 1978, now abandoned, which is a continuation-in-part of application Ser. No. 06/071,132, filed Sept. 6, 1979, now abandoned.

This invention relates to a zoom lens having the capability of focusing continuously from infinity to a magnification of 1:4 to 1:2 at the longer equivalent focal length (EFL) without switching the zooming groups into a close focusing mode.

In most zoom lenses, the first group of lens elements may be moved along the optical to achieve focusing from infinity to moderately close distances, typically having a magnification of 1/10 or less. To enable these lenses to focus still closer, in a macro or close focusing mode, the lens is adjusted by suitable repositioning of the zooming groups, or by other lens group repositioning.

An example of such optics is disclosed in U.S. Pat. No. 3,817,600, where the zooming elements are moved in a different relationship to achieve close focusing below two meters up to a magnification of 1:2.2 as close as eighteen inches from the front element.

A lens of this type has proven to be an excellent optic and has been marketed as a Vivitar Series I Lens of 70–210 mm equivalent focal length (EFL). In the close focusing mode, it is possible to achieve magnifications in the range of 1:2.2 to 1:5. However, this lens does require repositioning of the zooming groups for different movement for close focusing.

Attempted competitive lenses of lesser quality generally exhibit poor off-axis image quality caused by large amounts of astigmatism in the close focusing mode. In some cases, spherical aberration causing poor contrast is also introduced.

The present invention provides a mechanically compensated zoom lens having the capability of focusing continuously from infinity down to the macro or close focusing mode by small movement of a front focusing group while maintaining compactness of the lens. For purposes of definition, "macro" refers to close-up photography with image magnifications, typically in the range of 1:2 magnification.

Conventional zoom lenses are characterized by a weak power (long focal length) first group which had been believed to be the best way to minimize aberration change due to focusing. Zoom lenses generally do not have an optically strong front group.

In the present invention, close focusing capability to a magnification of 1:2 may be achieved by the appropriate design of the front focusing group in relation to the overall lens. This design overcomes the usual design shortcomings by having stability of spherical aberration with conjugate change, strong power, and simple construction. These generally are considered to be conflicting parameters. It is well known that the front group is required to be quite stable with respect to variation of spherical aberration over the focusing range. However, it is also desirable that the front group have strong power to provide a compact system and to reduce as much as possible the required focusing motion. In addition, it is mechanically convenient that the front group be of simple construction so that the weight of the lens is reduced. This is particularly important for maintaining balance of a lens with a large focusing range, normally resulting in a long lens travel to achieve close focusing. It is also desirable to achieve the above-mentioned effects in a compact optical system having a relatively fast aperture.

This is achieved in a zoom lens in which the front focusing group has a given relationship to the overall power of the lens and where the elements of the focusing group and the other groups have a given relationship as hereinafter described. Additionally, the fourth or relay lens group should have a telephoto ratio of unity or less in view of the construction of the front focusing group.

Briefly stated, a lens embodying the invention comprises four groups, a front group movable axially for focusing, second and third groups movable axially to vary the equivalent focal length of the lens, and a fourth relay group which has a small telephoto ratio. The front group is relatively strong in power to add compactness to the lens, and comprise two components, a singlet and a doublet. The ratio of the power of the image side component to the object side component has a predetermined relation as well as the power of the entire first group to the power of the lens at its longest equivalent focal length.

An object of this invention is to proved a new and improved relatively compact, highly corrected zoom lens which is capable of focusing continuously over a range from infinity to a close focusing mode by movement of only a front focusing group.

Figure 2:
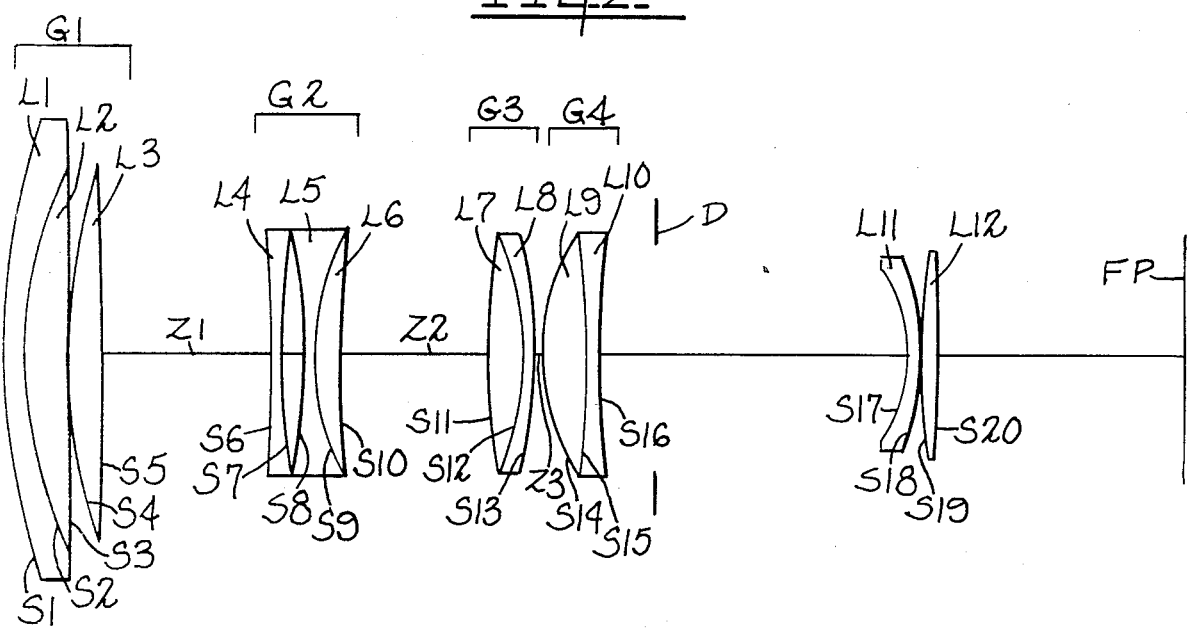

The features of the invention which are believed to be novel are particularly pointed out and distinctly claimed in the concluding portion of this specification. The invention, however, both as to its organization and operation, together with further objects and advantages thereof may best be appreciated by reference to the following detailed description taken in conjunction with the drawings, wherein:

FIGS. 1–3 are diagrammatic side views of lens embodying the invention.

A lens embodying the invention includes a strongly positive first group G1 as hereinafter described which is movable axially for focusing of the optical system. The second group G2 is a variator of negative power movable along the optical axis for varying the equivalent focal length of the objective lens. This group G2 is movable along with, and relative to a third group G3 which acts as a compensator to maintain a fixed image plane as the focal length of the optical system is varied. Although this lens is capable of focusing to extremely close distances, the zoom components G2 and G3 are not required to be independently adjustable to assist in the focusing of the optical system when in a macro or close focusing range. Group G4 is a fixed objective lens for relaying the imaging to the image or focal plane of the system. This relay group has a telephoto ratio of less than unity. The term "telephoto ratio" is the ratio of the front vertex distance to the equivalent focal length. The front vertex distance (FVD) is the distance from the object side front vertex to the image plane of the lens when the lens is focused at infinity.

In an optical design typifying the embodiments, the first positive group G1 comprises two positive components or subgroups, a doublet L1, L2, followed by a positive element L3 as exemplified alternatively, the first subgroup may be the singlet followed by the doublet.

The elements of group G1 satisfy the conditions:

$$0 < K_{12}/K_{11} < 2.0$$

where $K_{11}$ designates the power of the object side component or subgroup within the front group G1 and $K_{12}$ designates the power of the image side component of the front group, Also, $$0.67 > F_1/F_L > 0.4$$

where $F_1$ is the equivalent focal length (EFL) of the first group, and $F_L$ is the long extreme equivalent focal length of the lens.

The parameters set forth are necessary for suitably balancing the aberrations of the lens system when the lens is focused across the intended broad range. Together, the conditions prevent or significantly reduce aggravation of spherical aberrations and astigmatism which may occur as the angles of the incident light rays change due to focusing of the lens on distant, and extremely close objects. Satisfaction of these parameters ensures a compact lens with a relatively short focusing motion. As set forth hereinafter, the dimensions, relationships, and parameters of the lenses are such as to satisfy the conditions as set forth above.

The first parameter $$0 < K_{12}/K_{11} > 2.0$$

is required in order to yield the distribution of power necessary for stability of spherical aberration with respect to conjugate change.

The second parameter $$0.67 > F_1/F_L > 0.4$$

is required because of the relationship between the power $K_1$ of the focusing group and the necessary focusing travel FT for a given object distance FD, namely $$FD = -F_1^2 \text{ (mm)}/F_T$$

where FD is the focusing distance, $F_1$ is the EFL of the front focusing group and $F_T$ is the focusing travel of the front group from infinity to the closest focusing distance. As the power of group G1 increases, then $F_1$ correspondingly decreases, and the focusing distance FD decreases. The small telephoto ratio $T_4$ of group G4 contributes to the compactness of the lens.

If the power of the front group becomes too strong, it is difficult or impossible to satisfactorily correct the spherical aberration and astigmatism over a range of conjugates.

The first lens group G1, as shown in FIG. 1, includes a positive doublet comprising a negative element L1 and a biconvex element L2 formed as a cemented doublet of strong positive power, followed by a positive meniscus element L3 convex to the object. These elements are in fixed relation, adapted to be shifted axially as a group for focusing images of subjects at distances as close as 20 inches from the front element L1, regardless of the equivalent focal length of the lens. The relatively strong power in group G1 reduces the focusing travel as will be apparent from the foregoing equation.

The variator or second lens group G2 is negative and is air-spaced from the first component by a variable amount. Group G2 includes a negative element L4 which is separated from a negative biconcave doublet L5, L6.

The compensator or third lens group L3 is biconvex and of positive power and includes a negative meniscus L7 and a biconvex element L8. Group G3 is movable axially relative to the variator group G2 and the forward component of a fixed relay group G3.

The relay group G4 is a telephoto lens divided into two separate widely spaced subgroups or components. The forward component has positive power and is fixed relative to the rear component of that group. The forward component includes a positive element L9 spaced from a doublet formed of positive element L10 and a negative element L11 forming a cemented doublet. The rear component, a negative component L12, is closely spaced to a positive component L13. Group G4 has a telephoto ratio of unity or less and preferably is 0.9 or less.

The foregoing preferred embodiment includes 13 elements arranged in the four component groups.

The powers of the lens groups have the following relationship:

$$1.5 > K_1/K_M > 1.0$$

$$4.0 > |K_2/K_M| > 2.2$$

$$1.7 > K_3 K_M > 1.0$$

$$1.3 > K_4 K_M > 0.4$$

where $K_1$, $K_2$, $K_3$ and $K_4$ are the powers of groups G1, G2, G3, and G4 respectively, $K_M$ is the geometric mean of the powers of the lens at the extremes of its focal length expressed as $$K_M = \sqrt{K_S K_L}$$

where $K_S$ is the power at the shortest EFL and $K_L$ is the power at the longest EFL.

In the following tables, various embodiments of the invention are set forth for various EFL ranges, with the parameters of the invention. In the following prescription tables, the reference L followed by an arabic numeral indicates the lens elements progressively from the object end to the image end of the lens. The reference surface numbers S are the progressive lens surface radii. $N_d$ is the index of refraction of the lens elements. $V_d$ is the dispersion of the lens elements as measured by the Abbe number. The spaces Z are spaces between lens groups which vary with change in equivalent focal length (EFL). Positive surface radii are struck from the right at the optical axis. Negative radii are struck from the left at the optical axis.

A lens as shown in FIG. 1 scaled to an image frame of 24×36 mm and EFL's of 101 mm to 195 mm is substantially described in Table I. (See next page)

TABLE I

| Element | Surface Radii (mm) | Axial Distance Between Surfaces (mm) | $N_d$ | $V_d$ |
|---|---|---|---|---|
| L1 | S1 = 69.077 | 3.0 | 1.7847 | 26.06 |
| L2 | S2 = 44.817 | 10.0 | 1.5101 | 63.43 |
|  | S3 = −213.552 | 0.3 |  |  |
| L3 | S4 = 92.077 | 3.5 | 1.5101 | 63.43 |
|  | S5 = 142.825 | Z1 |  |  |
| L4 | S6 = 600.754 | 2.0 | 1.6583 | 57.26 |
|  | S7 = 69.943 | 3.5 |  |  |
| L5 | S8 = −71.613 | 2.0 | 1.6910 | 54.70 |
| L6 | S9 = 32.133 | 4.76 | 1.8467 | 23.83 |
|  | S10 = 76.984 | Z2 |  |  |
| L7 | S11 = 74.163 | 2.0 | 1.7847 | 26.06 |

TABLE I-continued

| | | | | |
|---|---|---|---|---|
| L8 | S12 = 39.674 | 6.29 | 1.5638 | 60.83 |
| | S13 = −96.905 | Z3 | | |
| L9 | S14 = 78.588 | 3.0 | 1.5101 | 63.43 |
| | S15 = 693.028 | 0.3 | | |
| L10 | S16 = 26.460 | 5.826 | 1.5101 | 63.43 |
| L11 | S17 = 427.148 | 2.0 | 1.8061 | 40.74 |
| | S18 = 45.219 | 4.81 | | |
| | Aperture Stop | 40.26 | | |
| L12 | S19 = −18.927 | 2.0 | 1.7725 | 49.62 |
| | S20 = −53.001 | 0.3 | | |
| L13 | S21 = 412.053 | 3.42 | 1.6727 | 32.17 |
| | S22 = −53.841 | | | |

| EFL | Z1 | Z2 | Z3 |
|---|---|---|---|
| 101mm | 2.81mm | 31.68mm | 3.72mm |
| 152 | 18.84 | 14.89 | 4.50 |
| 195 | 25.51 | 1.33 | 11.37 |

A lens as shown in FIG. 2 scaled to an image frame of 24×36 mm and EFL's of 76.0 mm to 200.1 mm is substantially described in Table II.

TABLE II

| Element | Surface Radii (mm) | Axial Distance Between Surface (mm) | $N_d$ | $V_d$ |
|---|---|---|---|---|
| L1 | S1 = 100.120 | 3.0 | 1.785 | 26.1 |
| L2 | S2 = 58.560 | 7.34 | 1.510 | 63.4 |
| | S3 = plano | 0.3 | | |
| L3 | S4 = 97.870 | 5.15 | 1.510 | 63.4 |
| | S5 = −539.860 | Z1 | | |
| L4 | S6 = 205.760 | 1.5 | 1.720 | 50.3 |
| | S7 = 70.027 | 3.74 | | |
| L5 | S8 = −84.552 | 1.5 | 1.720 | 50.3 |
| L6 | S9 = 27.698 | 4.51 | 1.785 | 25.7 |
| | S10 = 126.250 | Z2 | | |
| L7 | S11 = 104.624 | 6.08 | 1.487 | 70.4 |
| L8 | S12 = −32.924 | 1.2 | 1.785 | 26.1 |
| | S13 = −51.566 | Z3 | | |
| L9 | S14 = 32.652 | 6.24 | 1.573 | 57.5 |
| L10 | S15 = −85.340 | 2.0 | 1.806 | 40.7 |
| | S16 = 175.960 | 4.81 | | |
| | Aperture Stop | 42.660 | | |
| L11 | S17 = −19.451 | 2.0 | 1.804 | 46.5Z |
| | S18 = −37.265 | 0.3 | | |
| L12 | S19 = 101.789 | 2.27 | 1.673 | 3.22 |
| | S20 = −300.14 | | | |

| EFL | Z1 | Z2 | Z3 |
|---|---|---|---|
| 76.00mm | 1.73mm | 37.58mm | 12.09mm |
| 125.00 | 26.25 | 23.15 | 2.00 |
| 201.00 | 39.92 | 1.48 | 10.00 |

Another embodiment of an optical system according to this invention is given in Table III. In this embodiment, group G1 is substantially the same as descried with respect to FIG. 2, but S3 is convex and S5 is concave. Group G2 includes a first negative element L4 and a doublet with negative element L5 and a positive element L6. L4 is spaced slightly from the doublet and is spaced variably by a larger distance from group G3.

In group G3, the doublet is reversed with respect to FIG. 2 in that L7 is a meniscus and L8 is a biconvex element. Group G4 has the same elemental configuration as FIG. 2.

A lens as shown in FIG. 2 scaled to an image frame of 24×36 mm and EFL's of 72 mm to 150 mm is substantially described in Table III.

TABLE III

| Element | Surface Radii (mm) | Axial Distance Between Surface (mm) | $N_d$ | $V_d$ |
|---|---|---|---|---|
| L1 | S1 = 62.296 | 3.0 | 1.7847 | 26.06 |
| L2 | S2 = 41.370 | 12.806 | 1.4875 | 70.44 |
| | S3 = −266.277 | 0.3 | | |
| L3 | S4 = 86.478 | 4.095 | 1.4875 | 70.44 |
| | S5 = 2731.894 | Z1 | | |
| L4 | S6 = −259.053 | 2.0 | 1.6910 | 54.70 |
| | S7 = 65.984 | 2.805 | | |
| L5 | S8 = −71.603 | 2.0 | 1.7433 | 49.22 |
| L6 | S9 = 24.730 | 4.755 | 1.8467 | 23.83 |
| | S10 = 72.248 | Z2 | | |
| L7 | S11 = 49.336 | 2.0 | 1.8467 | 23.83 |
| L8 | S12 = 25.951 | 6.287 | 1.6667 | 48.30 |
| | S13 = −133.121 | Z3 | | |
| L9 | S14 = 22.123 | 5.381 | 1.4875 | 70.44 |
| L10 | S15 = −684.989 | 2.0 | 1.8042 | 46.50 |
| | S16 = 66.251 | 29.67 | | |
| L11 | S17 = −14.503 | 2.0 | 1.5310 | 58.20 |
| | S18 = −31.216 | 0.3 | | |
| L12 | S19 = 120.523 | 2.350 | | 46.50 |
| | S20 = −189.269 | | | |

| EFL | Z1 | Z2 | Z3 |
|---|---|---|---|
| 72.0mm | 1.6 | 27.051 | 0.3 |
| 111.0 | 14.289 | 13.162 | 1.5 |
| 150.0 | 19.843 | 0.3 | 8.809 |

Another twelve element form of the invention is generally similar to FIG. 2. This lens differs from FIG. 2 in that surface S3 is very weakly negative instead of plano, and surface S12 is positive, thus reversing the doublet forming group G3.

As scaled to a 24×36 mm image frame and EFL's of 72 mm to 203 mm, this lens is substantially described in Table IV.

TABLE IV

| Element | Surface Radii (mm) | Axial Distance Between Surfaces (mm) | $N_d$ | $V_d$ |
|---|---|---|---|---|
| L1 | S1 = 87.504 | 3.000 | 1.7847 | 26.06 |
| L2 | S2 = 57.456 | 12.806 | 1.4875 | 70.44 |
| | S3 = −576.167 | 0.300 | | |
| L3 | S4 = 110.904 | 3.500 | 1.4875 | 70.44 |
| | S5 = −1960.632 | Z1 | | |
| L4 | S6 = −829.304 | 2.000 | 1.6910 | 54.70 |
| | S7 = 84.246 | 3.075 | | |
| L5 | S8 = −91.582 | 2.000 | 1.7433 | 49.22 |
| L6 | S9 = 29.357 | 4.7555 | 1.8467 | 23.83 |
| | S10 = 80.962 | Z2 | | |
| L7 | S11 = 76.817 | 2.000 | 1.8467 | 23.83 |
| L8 | S12 = 36.571 | 6.287 | 1.6667 | 48.30 |
| | S13 = −118.534 | Z3 | | |
| L9 | S14 = 25.919 | 7.000 | 1.4875 | 70.44 |
| L10 | S15 = −154.920 | 2.000 | 1.8042 | 46.50 |
| | S16 = 92.608 | 39.753 | | |
| L11 | S17 = −17.481 | 2.000 | 1.8042 | 46.50 |
| | S18 = −37.440 | 2.029 | | |
| L12 | S19 = 251.831 | 2.452 | 1.7495 | 35.04 |
| | S20 = −69.558 | | | |

| EFL | Z1 | Z2 | Z3 |
|---|---|---|---|
| 72.0mm | 1.5mm | 49.045mm | 0.3mm |
| 150.0 | 30.760 | 18.585 | 1.5 |
| 203.0 | 36.664 | 0.3 | 13.881 |

Another embodiment of the invention as shown in FIG. 3, scaled to an image frame of 24×36 mm and EFL's of 101 mm to 194 mm, is substantially described in Table V.

TABLE V

| Element | Surface Radii (mm) | Axial Distance Between Surfaces (mm) | $N_d$ | $V_d$ |
|---|---|---|---|---|
| L1 | S1 = 70.981 | 3.0 | 1.7847 | 26.06 |
| L2 | S2 = 45.725 | 10.0 | 1.5101 | 63.43 |
| | S3 = −190.826 | 0.3 | | |

TABLE V-continued

| | | | | |
|---|---|---|---|---|
| L3 | S4 = 77.534 | 3.5 | 1.5101 | 63.43 |
| | S5 = 115.121 | Z1 | | |
| L4 | S6 = −366.358 | 3.829 | 1.8467 | 23.83 |
| L5 | S7 = −49.175 | 2.0 | 1.6910 | 54.70 |
| | S8 = 61.777 | 3.961 | | |
| L6 | S9 = −53.090 | 2.0 | 1.6583 | 57.26 |
| | S10 = 255.263 | Z2 | | |
| L7 | S11 = 93.727 | 6.429 | 1.5638 | 60.83 |
| L8 | S12 = −35.861 | 2.0 | 1.7847 | 26.06 |
| | S13 = −71.255 | Z3 | | |
| L9 | S14 = 74.385 | 2.629 | 1.5101 | 63.43 |
| | S14 = 259.362 | 0.3 | | |
| L10 | S16 = 26.413 | 5.653 | 1.5101 | 63.43 |
| L11 | S17 = 366.100 | 2.0 | 1.8061 | 40.74 |
| | S18 = 43.497 | 27.063 | | |
| L12 | S19 = 112.212 | 2.615 | 1.6727 | 32.17 |
| | S20 = −77.326 | 6.977 | | |
| L13 | S21 = −24.455 | 2.0 | 1.7725 | 49.62 |
| | S22 = −97.188 | | | |

| EFL | Z1 | Z2 | Z3 |
|---|---|---|---|
| 101.0mm | 2.812mm | 29.314mm | 3.744mm |
| 152.0 | 18.190 | 13.176 | 4.503 |
| 194.0 | 24.580 | 0.3 | 10.990 |

Another embodiment of the invention is substantially as shown in FIG. 3 differing in elemental configuration only that in negative group G3 the elements L7 and L8 are reversed. Such lens as scaled to an image frame of 24×36 mm and EFL of 71.5 mm to 146.5 mm is substantially described in Table VI.

TABLE VI

| Element | Surface Radii (mm) | Axial Distance Between Surfaces (mm) | $N_d$ | $V_d$ |
|---|---|---|---|---|
| L1 | S1 = 55.041 | 2.50 | 1.785 | 26.1 |
| L2 | S2 = 36.225 | 8.50 | 1.510 | 63.4 |
| | S3 = −246.043 | 0.2 | | |
| L3 | S4 = 86.032 | 3.0 | 1.510 | 63.4 |
| | S5 = 380.808 | Z1 | | |
| L4 | S6 = −192.163 | 1.5 | 1.658 | 57.3 |
| | S7 = 51.582 | 2.56 | | |
| L5 | S8 = −63.000 | 1.5 | 1.691 | 54.7 |
| L6 | S9 = 21.990 | 3.6 | 1.785 | 26.1 |
| | S10 = 67.930 | Z2 | | |
| L7 | S11 = 54.447 | 1.5 | 1.785 | 26.1 |
| L8 | S12 = 27.783 | 5.5 | 1.540 | 59.7 |
| | S13 = −85.292 | Z3 | | |
| L9 | S14 = 74.074 | 2.5 | 1.510 | 63.4 |
| | S15 = −300.882 | 0.2 | | |
| L10 | S16 = 18.412 | 5.0 | 1.510 | 63.4 |
| L11 | S17 = 153.597 | 1.5 | 1.806 | 40.7 |
| | S18 = 31.629 | 2.25 | | |
| | Aperture | 26.614 | | |
| L12 | S19 = −13.655 | 1.5 | 1.773 | 49.6 |
| | S20 = −23.408 | 0.2 | | |
| L13 | S21 = 93.578 | 3.5 | 1.673 | 3.22 |
| | S22 = −139.289 | | | |

| EFL | Z1 | Z2 | Z3 |
|---|---|---|---|
| 71.5 mm | 1.50mm | 22.89mm | 3.49mm |
| 110.0 | 14.45 | 11.83 | 1.60 |
| 146.5 | 20.58 | 1.00 | 6.30 |

As previously pointed out, there are certain parameters which must be satisfied to achieve the close focusing capability with minimum focusing travel. Table VII sets forth the important parameters of each lens.

TABLE VII

| Table | $K_1$ | $F_1$ | $K_L$ | $F_L$ | $F_1/F_L$ | $K_{12}/K_{11}$ | $T_4$ |
|---|---|---|---|---|---|---|---|
| I | .0096 | 104.17 | .0051 | 195 | .534 | 0.26 | 0.74 |
| II | .0092 | 109.13 | .0050 | 201 | .543 | 1.90 | 0.80 |
| III | .0124 | 80.65 | .0066 | 150 | .538 | 0.75 | 0.84 |
| IV | .0091 | 109.89 | .0049 | 203 | .541 | 1.00 | 0.79 |
| V | .0100 | 100.0 | .0052 | 194 | .515 | 0.33 | 0.85 |
| VI | .0131 | 76.1 | .0068 | 146.5 | .519 | 0.53 | | where
$K_1$ is the power of group G1,
$F_1$ is the EFL of group G1,
$K_L$ is the power of the lens at its longest EFL,
$F_L$ is the longest EFL of the lens,
$K_{12}$ is the power of the second component L3 of the group G1,
$K_{11}$ is the power of the first component L1, L2 of group G.
$T_4$ is the telephoto ratio of the fourth group.

Table VIII sets forth the powers of the various groups as the reciprocal of the EFL and the geometric mean power $K_M$ of each lens.

TABLE VIII

| Table | $K_1$ | $K_2$ | $K_3$ | $K_4$ | $K_M$ |
|---|---|---|---|---|---|
| I | .0096 | −.0251 | .0107 | .0053 | .0071 |
| II | .0092 | −.0197 | .0108 | .0066 | .0081 |
| III | .0124 | −.0326 | .0151 | .0061 | .0096 |
| IV | .0091 | −.0251 | .0116 | .0042 | .0083 |
| V | .0100 | −.0261 | .0107 | .0061 | .0071 |
| VI | .0131 | −.0361 | .0118 | .0116 | .0098 | where $K_1$–$K_4$ are the powers of groups G1–G4 respectively expressed as the reciprocal of the EFL's and $K_M$ is the geometric mean of the power of each lens at the extremes of their EFL's It will be noted that in all examples the front focusing group G1 is optically stronger than the fourth relay group G4, and the following relationship exists $$2.5K_4 > K_1 > K_4$$

It may thus be seen that the objects of the invention set forth as well as those made apparent from the foregoing description are efficiently attained. While preferred embodiments of the invention have been set forth for purposes of disclosure, modification to the disclosed embodiments of the invention as well as other embodiments thereof may occur to those skilled in the art. Accordingly, the appended claims are intended to cover all embodiments of the invention and modifications to the disclosed embodiments which do not depart from the spirit and scope of the invention.

What is claimed is:

1. A zoom lens comprising a front focusing group of positive power movable axially, a second negative group, a third group, said second and third groups being movable axially of said lens for varying the equivalent focal length, and a fourth positive group, said first group comprising object and image side components, said components having the following relationship $$2.0 > K_{12}/K_{11} > 0$$

where $K_{12}$ is the power of the image side component and $K_{11}$ is the power of the object side component, and $$0.55 > F_1/F_L > 0.50$$

where $F_1$ is the equivalent focal length of the first group, $F_L$ is the longest equivalent focal length of the lens, and said fourth group has a telephoto ratio less than 0.9.

2. The lens of claim 1 where said object side element of said first group is a doublet and the image side element of said first group is a singlet.

3. The lens of claim 1 further defined as $1.5 > K_1/K_M > 1.0$ $4.0 > |K_2/K_M| > 2.2$ $1.7 > K_3/K_M > 1.0$ $1.3 > K_4/K_M > 0.4$ where $K_1$, $K_2$, $K_3$, and $K_4$ are the powers of said first, second, third, and fourth groups, and $K_M$ is the geometric mean of the powers of the lens at the extremes of its focal lengths.

4. The lens of claim 1 where said third group is a biconvex doublet.

5. The lens of claim 1 where $2.5K_4 > K_1 > 1.0K_4$ where $K_1$ is the power of the first group and $K_4$ is the power of the fourth group.

6. A lens according to claim 1 wherein said second group consists of a negative singlet followed by a negative doublet.

7. A lens according to claim 1 wherein said second group consists of a negative doublet followed by a negative singlet.

8. A lens according to claim 2, wherein said third group consists of a biconvex doublet.

9. A lens according to claim 1 where said fourth group comprises a positive subgroup followed by a negative subgroup with a large separating air-space.

10. A lens according to claim 9 wherein said first subgroup consists of a positive doublet.

11. A lens according to claim 9 wherein said second subgroup consists of a positive lens followed by a negative lens.

12. A lens according to claim 9 wherein said second subgroup consists of a negative lens followed by a positive lens.

13. A zoom lens according to claim 1, wherein said second lens group is of negative power, said second group being a variator group consisting of a negative singlet and a negative doublet; a third lens group of positive power, said third group consisting of a positive doublet, and a positive fourth group fixed in relation to the focal plane.

14. A lens according to claim 1 scaled to an equivalent focal length of 101 mm to 195 mm substantially as described

| Element | Surface Radii (mm) | Axial Distance Between Surfaces (mm) | $N_d$ | $V_d$ |
|---|---|---|---|---|
| L1 | S1 = 69.077 | 3.0 | 1.7847 | 26.06 |
| L2 | S2 = 44.817 | 10.0 | 1.5101 | 63.43 |
| | S3 = −213.552 | 0.3 | | |
| L3 | S4 = 92.077 | 3.5 | 1.5101 | 63.43 |
| | S5 = 142.825 | Z1 | | |
| L4 | S6 = 600.754 | 2.0 | 1.6583 | 57.26 |
| | S7 = 69.943 | 3.5 | | |
| L5 | S8 = −71.613 | 2.0 | 1.6910 | 54.70 |
| L6 | S9 = 32.133 | 4.76 | 1.8467 | 23.83 |
| | S10 = 76.984 | Z2 | | |
| L7 | S11 = 74.163 | 2.0 | 1.7847 | 26.06 |
| L8 | S12 = 39.674 | 6.29 | 1.5638 | 60.83 |
| L9 | S13 = −96.905 | Z3 | | |
| | S14 = 78.588 | 3.0 | 1.5101 | 63.43 |
| | S15 = 693.028 | 0.3 | | |
| L10 | S16 = 26.460 | 5.826 | 1.5101 | 63.43 |
| L11 | S17 = 427.148 | 2.0 | 1.8061 | 40.74 |
| | S18 = 45.219 | 4.81 | | |
| | Aperture Stop | 40.26 | | |
| L12 | S19 = −18.927 | 2.0 | 1.7725 | 49.62 |
| | S20 = −53.001 | 0.3 | | |
| L13 | S21 = 412.053 | 3.42 | 1.6727 | 32.17 |
| | S22 = −53.841 | | | |

| EFL | Z1 | Z2 | Z3 |
|---|---|---|---|
| 101mm | 2.81 mm | 31.68mm | 3.72mm |
| 152 | 18.84 | 14.89 | 4.50 |
| 195 | 25.51 | 1.33 | 11.37 | where the lens comprises elements L1–L13 having surfaces S1–S22, the index of refraction is given by $N_d$, the dispersion is measured by the Abbe number as given by $V_d$, and Z1, Z2 and Z3 are the variable air-spacings at the indicated equivalent focal length (EFL).

15. A lens according to claim 1 scaled to an equivalent focal length of 76.0 mm to 200.1 mm substantially as described

| Element | Surface Radii (mm) | Axial Distance Between Surfaces (mm) | $N_d$ | $V_d$ |
|---|---|---|---|---|
| L1 | S1 = 100.120 | 3.0 | 1.785 | 26.1 |
| L2 | S2 = 58.560 | 7.34 | 1.510 | 63.4 |
| | S3 = plano | 0.3 | | |
| L3 | S4 = 97.870 | 5.15 | 1.510 | 63.4 |
| | S5 = −539.860 | Z1 | | |
| L4 | S6 = 205.760 | 1.5 | 1.720 | 50.3 |
| | S7 = 70.027 | 3.74 | | |
| L5 | S8 = −84.552 | 1.5 | 1.720 | 50.3 |
| L6 | S9 = 27.698 | 4.51 | 1.785 | 25.7 |
| | S10 = 126.250 | Z2 | | |
| L7 | S11 = 104.624 | 6.08 | 1.487 | 70.4 |
| L8 | S12 = −32.924 | 1.2 | 1.785 | 26.1 |
| | S13 = −51.566 | Z3 | | |
| L9 | S14 = 32.652 | 6.24 | 1.573 | 57.5 |
| L10 | S15 = −85.340 | 2.0 | 1.806 | 40.7 |
| | S16 = 175.960 | 4.81 | | |
| | Aperture Stop | 42.660 | | |
| L11 | S17 = −19.451 | 2.0 | 1.804 | 46.5 |
| | S18 = −37.265 | 0.3 | | |
| L12 | S19 = 101.789 | 2.27 | 1.673 | 3.22 |
| | S20 = −300.147 | | | |

| EFL | Z1 | Z2 | Z3 |
|---|---|---|---|
| 76.00mm | 1.73mm | 37.58mm | 12.09mm |
| 125.00 | 26.25 | 23.15 | 2.00 |
| 201.00 | 39.92 | 1.48 | 10.00 | where the lens comprises elements L1–L12 having surfaces S1–S20, the index of refraction is given by $N_d$, the dispersion is measured by the Abbe number as given by $V_d$, and Z1, Z2 and Z3 are the variable air-spacings at the indicated equivalent focal length (EFL).

16. A lens according to claim 1 scaled to an equivalent focal length of 72 mm to 150 mm substantially as described

| Element | Surface Radii (mm) | Axial Distance Between Surfaces (mm) | $N_d$ | $V_d$ |
|---|---|---|---|---|
| L1 | S1 = 62.296 | 3.0 | 1.7847 | 26.06 |
| L2 | S2 = 41.370 | 12.806 | 1.4875 | 70.44 |
| | S3 = −266.277 | 0.3 | | |
| L3 | S4 = 86.478 | 4.095 | 1.4875 | 70.44 |
| | S5 = 2731.894 | Z1 | | |

-continued

| | | Axial Distance Between Surfaces (mm) | $N_d$ | $V_d$ |
|---|---|---|---|---|
| L4 | S6 = −259.053 | 2.0 | 1.6910 | 54.70 |
| | S7 = 65.984 | 2.805 | | |
| L5 | S8 = −71.603 | 2.0 | 1.7433 | 49.22 |
| L6 | S9 = 24.730 | 4.755 | 1.8467 | 23.83 |
| | S10 = 72.248 | Z2 | | |
| L7 | S11 = 49.336 | 2.0 | 1.8467 | 23.83 |
| L8 | S12 = 25.951 | 6.287 | 1.6667 | 48.30 |
| | S13 = −133.121 | Z3 | | |
| L9 | S14 = 22.123 | 5.381 | 1.4875 | 70.44 |
| L10 | S15 = −684.989 | 2.0 | 1.8042 | 46.50 |
| | S16 = 66.251 | 29.67 | | |
| L11 | S17 = −14.503 | 2.0 | 1.5310 | 58.20 |
| | S18 = −31.216 | 0.3 | | |
| L12 | S19 = 120.523 | 2.350 | 1.8040 | 46.50 |
| | S20 = −189.269 | | | |

| EFL | Z1 | Z2 | Z3 |
|---|---|---|---|
| 72.0mm | 1.6 | 27.051 | 0.3 |
| 111.0 | 14.289 | 13.162 | 1.5 |
| 150.0 | 19.843 | 0.3 | 8.809 | where the lens comprises elements L1–L12 having surfaces S1–S20, the index of refraction is given by $N_d$, the dispersion is measured by the Abbe number as given by $V_d$, and Z1, Z2 and Z3 are the variable air-spacings at the indicated equivalent focal length (EFL).

17. A lens according to claim 1 scaled to an equivalent focal length of 72 mm to 203 mm substantially as described

| Element | Surface Radii (mm) | Axial Distance Between Surfaces (mm) | $N_d$ | $V_d$ |
|---|---|---|---|---|
| L1 | S1 = 87.504 | 3.000 | 1.7847 | 26.06 |
| L2 | S2 = 57.456 | 12.806 | 1.4875 | 70.44 |
| | S3 = −576.167 | 0.300 | | |
| L3 | S4 = 110.904 | 3.500 | 1.4875 | 70.44 |
| | S5 = −1960.632 | Z1 | | |
| L4 | S6 = −829.307 | 2.000 | 1.6910 | 54.70 |
| | S7 = 84.246 | 3.075 | | |
| L5 | S8 = −91.582 | 2.000 | 1.7433 | 49.22 |
| L6 | S9 = 29.357 | 4.755 | 1.8467 | 23.83 |
| | S10 = 80.962 | Z2 | | |
| L7 | S11 = 76.817 | 2.000 | 1.8467 | 23.83 |
| L8 | S12 = 36.571 | 6.287 | 1.6667 | 48.30 |
| | S13 = −118.534 | Z3 | | |
| L9 | S14 = 25.919 | 7.000 | 1.4875 | 70.44 |
| L10 | S15 = −154.920 | 2.000 | 1.8042 | 46.50 |
| | S16 = 92.608 | 39.753 | | |
| L11 | S17 = −17.481 | 2.000 | 1.8042 | 46.50 |
| | S18 = −37.440 | 2.029 | | |
| L12 | S19 = 251.831 | 2.452 | 1.7495 | 35.04 |
| | S20 = −69.558 | | | |

| EFL | Z1 | Z2 | Z3 |
|---|---|---|---|
| 72.0mm | 1.5mm | 49.045mm | 0.3mm |
| 150.0 | 30.760 | 18.585 | 1.5 |
| 203.0 | 36.664 | 0.3 | 13.881 | where the lens comprises elements L1–L12 having surfaces S1–S20, the index of refraction is given by $N_d$, the dispersion is measured by the Abbe number as given by $V_d$, and Z1, Z2 and Z3 are the variable air-spacings at the indicated equivalent focal length (EFL).

18. A lens according to claim 1 scaled to an equivalent focal length of 101 mm to 194 mm substantially as described

| Element | Surface Radii (mm) | Axial Distance Between Surfaces (mm) | $N_d$ | $V_d$ |
|---|---|---|---|---|
| L1 | S1 = 70.981 | 3.0 | 1.7847 | 26.06 |
| L2 | S2 = 45.725 | 10.0 | 1.5101 | 63.43 |
| | S3 = −190.826 | 0.3 | | |
| L3 | S4 = 77.534 | 3.5 | 1.5101 | 63.43 |
| | S5 = 115.121 | Z1 | | |
| L4 | S6 = −366.358 | 3.829 | 1.8467 | 23.83 |
| L5 | S7 = −49.175 | 2.0 | 1.6910 | 54.70 |
| | S8 = 61.777 | 3.961 | | |
| L6 | S9 = −53.090 | 2.0 | 1.6583 | 57.26 |
| | S10 = 255.263 | Z2 | | |
| L7 | S11 = 93.727 | 6.429 | 1.5638 | 60.83 |
| L8 | S12 = −35.861 | 2.0 | 1.7847 | 26.06 |
| | S13 = −71.255 | Z3 | | |
| L9 | S14 = 74.385 | 2.629 | 1.5101 | 63.43 |
| | S15 = 259.362 | 0.3 | | |
| L10 | S16 = 26.413 | 5.653 | 1.5101 | 63.43 |
| L11 | S17 = 366.100 | 2.0 | 1.8061 | 40.74 |
| | S18 = 43.497 | 27.063 | | |
| L12 | S19 = 112.212 | 2.615 | 1.6727 | 32.17 |
| | S20 = −77.326 | 6.977 | | |
| L13 | S21 = −24.455 | 2.0 | 1.7725 | 49.62 |
| | S22 = −97.188 | | | |

| EFL | Z1 | Z2 | Z3 |
|---|---|---|---|
| 101.0mm | 2.812mm | 29.314mm | 3.744mm |
| 152.0 | 18.190 | 13.176 | 4.503 |
| 194.0 | 24.580 | 0.3 | 10.990 | where the lens comprises elements L1–L13 having surfaces S1–S22, the index of refraction is given by $N_d$, the dispersion is measured by the Abbe number as given by $V_d$, and Z1, Z2 and Z3 are the variable air-spacings at the indicated equivalent focal length (EFL).

19. A lens according to claim 1 scaled to an equivalent focal length of 76 mm to 201 mm substantially as described

| Element | Surface Radii (mm) | Axial Distance Between Surfaces (mm) | $N_d$ | $V_d$ |
|---|---|---|---|---|
| L1 | S1 = 55.041 | 2.50 | 1.785 | 26.1 |
| L2 | S2 = 36.225 | 8.50 | 1.510 | 63.4 |
| | S3 = −246.043 | 0.2 | | |
| L3 | S4 = 86.032 | 3.0 | 1.510 | 63.4 |
| | S5 = 380.808 | Z1 | | |
| L4 | S6 = −192.163 | 1.5 | 1.658 | 57.3 |
| | S7 = 51.582 | 2.56 | | |
| L5 | S8 = −63.000 | 1.5 | 1.691 | 54.7 |
| L6 | S9 = 21.990 | 3.6 | 1.785 | 26.1 |
| | S10 = 67.930 | Z2 | | |
| L7 | S11 = 54.447 | 1.5 | 1.785 | 26.1 |
| L8 | S12 = 27.783 | 5.5 | 1.540 | 59.7 |
| | S13 = −85.292 | Z3 | | |
| L9 | S14 = 74.074 | 2.5 | 1.510 | 63.4 |
| | S15 = −300.882 | 0.2 | | |
| L10 | S16 = 18.412 | 5.0 | 1.510 | 63.4 |
| L11 | S17 = 153.954 | 1.5 | 1.806 | 40.7 |
| | S18 = 31.629 | 2.25 | | |
| | Aperture | 26.614 | | |
| L12 | S19 = −13.655 | 1.5 | 1.773 | 49.6 |
| | S20 = −23.408 | 0.2 | | |
| L13 | S21 = 93.574 | 3.5 | 1.673 | 3.22 |
| | S22 = −139.289 | | | |

| EFL | Z1 | Z2 | Z3 |
|---|---|---|---|
| 71.5mm | 1.50mm | 22.89mm | 3.49mm |
| 110.0 | 14.45 | 11.83 | 1.60 |
| 146.5 | 20.58 | 1.00 | 6.30 | where the lens comprises elements L1–L13 having surfaces S1–S22, the index of refraction is given by $N_d$, the dispersion is measured by the Abbe number as given by $V_d$, Z1, Z2 and Z3 are the variable air-spacings at the indicated equivalent focal length (EFL).

20. A zoom lens comprising a first group of positive power movable axially for focusing,
a second negative group, a third positive group and a fourth positive group, said second and third groups being movable axially of said lens for varying the equivalent focal length thereof, and $$0.55 > F_1/F_L > 0.4$$

where $F_1$ is the equivalent focal length of the first group, $F_L$ is the longest equivalent focal length of the lens, and $$1.5 > K_1/K_M > 1.0$$
$$4.0 > |K_2/K_M| > 2.2$$
$$1.7 > K_3/K_M > 1.0$$
$$1.3 > K_4/K_M > 0.4$$

where $K_1$, $K_2$, $K_3$, and $K_4$ are the powers of said first, second, third, and fourth groups, and $K_M$ is the geometric mean of the powers of the lens at the extremes of its focal lengths said fourth group having a telephoto ratio of less than 0.9

21. A zoom lens comprising a front focusing group of positive power movable axially, a second negative group, a third group, said second and third groups being movable axially of said lens for varying the equivalent focal length, and a fourth positive group, said first group comprising a positive doublet and a positive singlet, said doublet and singlet having the following relationship $$2.0 > K_S/K_D > 0$$

where $K_S$ is the power of the singlet and $K_D$ is the power of the doublet, and $$0.55 > F_1/F_L > 0.50$$

where $F_1$ is the equivalent focal length of the first group, $F_L$ is the longest equivalent focal length of the lens, and said fourth group has a telephoto ratio less than 0.9.

* * * * *